United States Patent
Kogure et al.

(10) Patent No.: US 6,254,042 B1
(45) Date of Patent: Jul. 3, 2001

(54) WIRE HARNESS MOUNTING CONSTRUCTION

(75) Inventors: Naoto Kogure; Kenichiro Kawaguchi; Keizo Nishitani, all of Shizuoka (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 09/309,310

(22) Filed: May 11, 1999

(30) Foreign Application Priority Data

May 11, 1998 (JP) .................................. 10-127362

(51) Int. Cl.[7] .................................. F16F 3/08; F16F 3/12
(52) U.S. Cl. .................................. 248/74.1; 248/74.3
(58) Field of Search .................................. 248/74.1, 74.2, 248/74.3, 74.4; 292/318

(56) References Cited

U.S. PATENT DOCUMENTS

| | | | |
|---|---|---|---|
| 5,352,855 | * 10/1994 | Potter | 248/74.3 |
| 5,498,176 | 3/1996 | Hashizawa et al. | 439/585 |
| 5,669,591 | * 9/1997 | Perez | 248/74.1 |
| 5,713,542 | * 2/1998 | Benoit | 248/74.3 |
| 5,794,461 | * 8/1998 | Smith | 292/318 |
| 5,803,413 | * 9/1998 | Benoit et al. | 248/74.3 |
| 5,897,082 | * 4/1999 | Losada | 248/74.1 |

FOREIGN PATENT DOCUMENTS

| | | | |
|---|---|---|---|
| 7038273 | 10/1970 | (DE) . | |
| 42 04 187 A1 | 8/1993 | (DE) . | |
| 3-203122 | 9/1991 | (JP) | H01B/7/00 |
| 5-15359 | 2/1993 | (JP) | H01R/13/655 |
| 8-265934 | 10/1996 | (JP) | H02G/3/10 |
| 8-282406 | 10/1996 | (JP) | B60R/16/02 |

* cited by examiner

*Primary Examiner*—Ramon O. Ramirez
*Assistant Examiner*—J. DeLuca
(74) *Attorney, Agent, or Firm*—Sughrue, Mion, Zinn, Macpeak & Seas, PLLC

(57) ABSTRACT

Band bodies (31) of bendable harness fastening and fixing bands (30) are formed integrally on the vicinity of an outer surface of a duct partition wall (22a) of an air duct (21) on an instrument panel (20) of a vehicle body. First band retaining rings (24) are formed respectively on those portions of the instrument panel (20) corresponding respectively to the band bodies (31), and second band retaining rings (25) are formed on the outer surface of the air duct partition wall (22a). A series of catching notches (32), arranged in a one-way notched arresting manner, are formed on a reverse surface of the band body (31), and each of the first and second band retaining rings (24) and (25) have a lock portion for engagement with the catching notches (32) to prevent the backward movement of the band body. Any one of several kinds of wire harnesses (40) to (42) of different diameter can be fixed by the use of the first band retaining rings (24). Also, a wire harness (50) in the form of a flat cable of a flattened cross-section can be fixed by the use of the second band retaining rings (25).

4 Claims, 6 Drawing Sheets

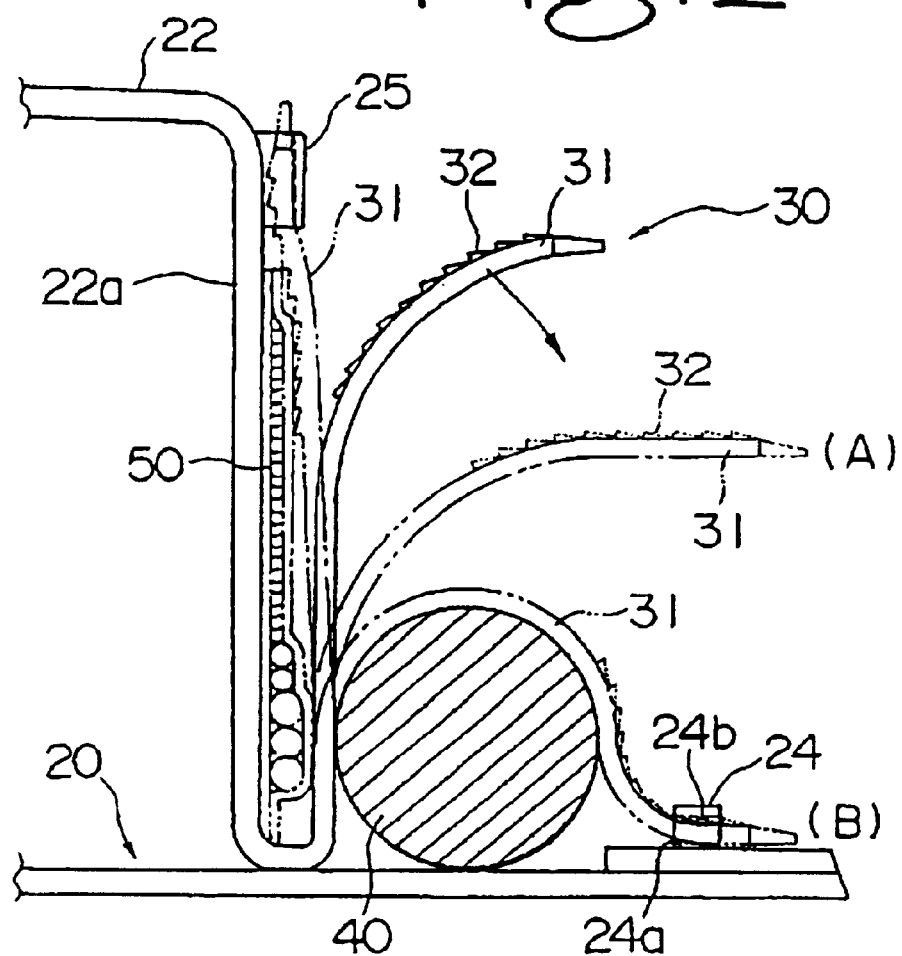

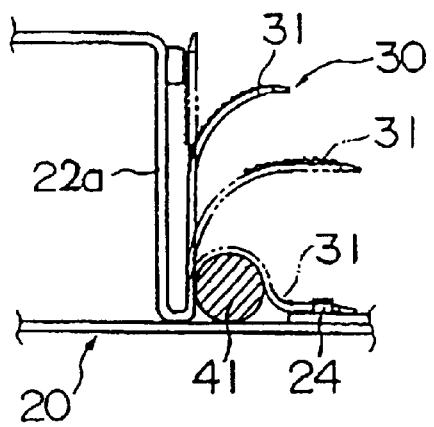
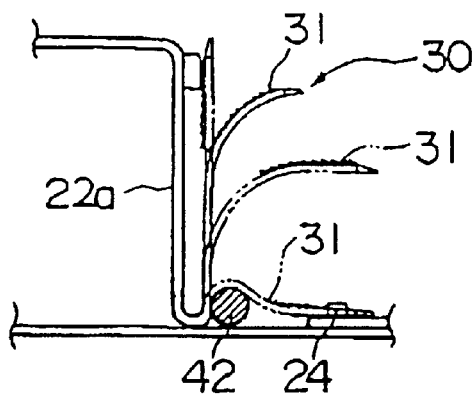
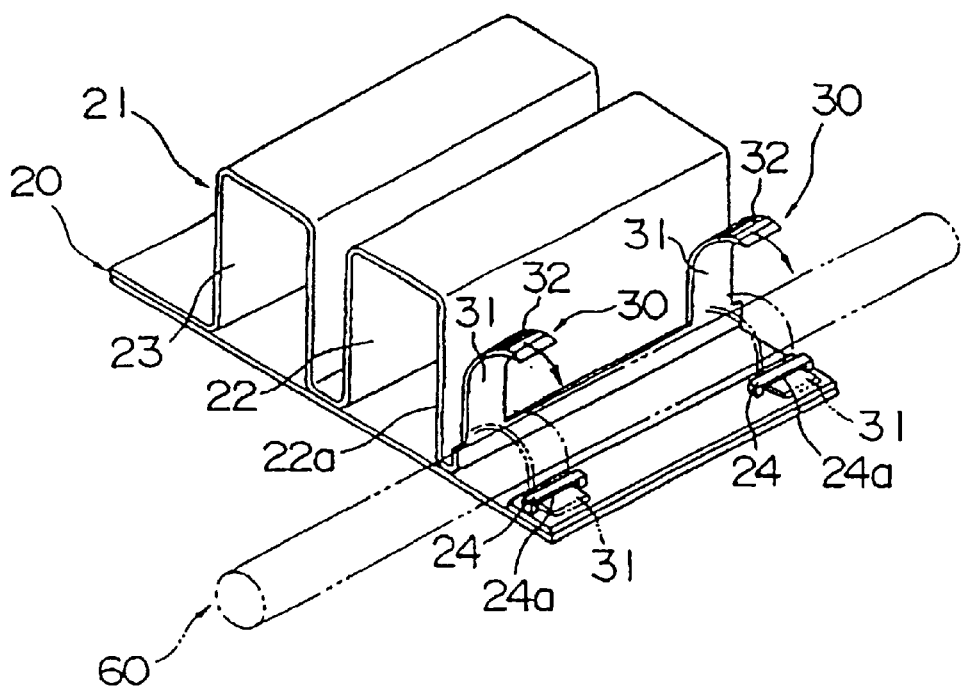

WIRE HARNESS MOUNTING CONSTRUCTION

BACKGROUND OF THE INVENTION

1. Field of the Invention

The present invention relates to a wire harness mounting construction in which a wire harness is arranged and installed on a mounting structural member such as a vehicle body.

The present application is based on Japanese Patent Application No. Hei. 10-127362, which is incorporated herein by reference.

2. Description of the Related Art

A wire harness for connecting an electric system in an automobile is arranged and installed in a vehicle body, and is fixed at predetermined positions in the vehicle body by fastening members (e.g. clips) and elongate case-like protectors which receive the wire harness for protection purposes.

FIGS. 7 and 8 show one example of a construction of fixing a wire harness on a vehicle body by the use of clips and protectors. As shown in FIG. 7, the wire harness 1 is branched at predetermined portions thereof, and is connected to various equipments, mounted on the automobile, through electric connectors 2 connected respectively to distal ends of the branches of the wire harness. The wire harness 1 thus arranged is fixed to the vehicle body at predetermined positions by the clips 3 and the protectors 4.

FIG. 8 shows an example of a mounting construction in which the wire harness 1 is mounted on an instrument panel 5. Two clips 3 are fixedly secured respectively to two adjacent mounting portions of the wire harness 1 by adhesive taps 4 wound on the wire harness. Two mounting holes 6, corresponding respectively to these clips 3, are formed through the instrument panel 5 on the vehicle body. The clips 3 are inserted respectively into the mounting holes 6 (as by undercut fitting) with one touch with a feeling of a resilient click, thereby fixing the wire harness 1 to the instrument panel 5.

FIG. 9 shows a construction in which a mounting structural member is other part than the instrument panel, and the wire harness 1 is installed on and fixed to that portion of the vehicle body in the vicinity of a door. In this case, a flange 8 is formed on a mounting portion of the vehicle body 7, and a mounting hole 9 for receiving the clip 3, shown in FIGS. 7 and 8, is formed through the flange 8. The flange 8 and the mounting hole 9 are provided at the vehicle body 7 by the use of a die.

FIG. 10 shows another wire harness mounting construction, that is, a branch wire harness support construction disclosed in Unexamined Japanese Patent Publication No. Hei. 8-282406.

In this case, a main wire harness 13 and a branch wire harness 14 are resiliently held between a pair of resilient grip piece portions 11 and 12.

The above-described wire harness mounting constructions have problems to be overcome.

In the case of the construction shown in FIGS. 7 and 8, the wire harness 1 is fixed to the instrument panel 5 of the vehicle body, and therefore the clips 3 of a special configuration must be prepared by the necessary processing. And besides, each clip 3 is fixedly secured to the wire harness 1 by the adhesive tapes 4 wound on the wire harness, and therefore the number of the parts, required for the fixing operation, increases, and much time and labor are required, which leads to a disadvantage that the cost increases because of the cost of the parts and the increased time and labor for the operation. Furthermore, the mounting holes 6, corresponding in number to the clips 3, must be formed accurately at predetermined intervals through the instrument panel 5, and thus the dimensional accuracy is required, which increases the overall production cost.

In the case where the wire harness is mounted on other portion of the vehicle body 7 than the instrument panel as shown in FIG. 9, the flange 8 must be formed on the vehicle body 7, and the clip mounting hole 9 must be formed through this flange. The formation of this flange by the die is complicated, and this contributes to the high cost.

In the case of the wire harness support construction shown in FIG. 10, the direction of resilient support of the main and branch wire harnesses 13 and 14 is limited. Namely, the gap between distal ends 11a and 12a of the grip piece portions 11 and 12 must be directed laterally (right or left) or upwardly so that the two wire harnesses 13 and 14, resiliently held between the two grip piece portions, will not be disengaged therefrom. Therefore, the direction of moving of the hand for snappingly inserting the two wire harness 13 and 14 between the grip piece portions 11 and 12 is predetermined, and this lowers the efficiency of the operation.

And besides, the wire harness support construction of FIG. 10 is designed to resiliently grip only those wire harnesses having a circular cross-section, and is not suited for so-called flat cables having a flattened cross-section, and therefore is not sufficiently versatile since the kinds of wires or cables to be supported are limited.

SUMMARY OF THE INVENTION

It is an object of the present invention to provide a wire harness mounting construction in which the cost can be reduced by reducing the number of parts required for mounting a wire harness.

Another object of the present invention is to provide a mounting construction in which where a vehicle body of an automobile is used as a mounting structural member, a wire harness can be fixed, effectively utilizing, for example, a recessed portion in a duct partition wall of an air duct mounted on an instrument panel.

A further object of the present invention is to provide a wire harness mounting construction which can mount several kinds of wire harnesses of different diameters, and enhances the efficiency of the mounting operation.

According to the first aspect of the present invention, there is provided a wire harness mounting construction which comprises at least one harness fastening and fixing band including an elastic or flexible band body which has a proximal end, connected to one of a recessed portion and a cavity portion of a mounting portion, and a free distal end, wherein by adjusting a length of the band body, the band body can be wound on any one of several kinds of wire harnesses of different diameters, and a band retaining ring formed on that portion of one of the recessed portion and the cavity portion corresponding to the harness fastening and fixing band, wherein the free distal end portion of the band body, wound on the wire harness, can be retained on the band retaining ring, so that the band retaining ring cooperates with the harness fastening and fixing band to fix the wire harness. In this construction, the bendable harness fastening and fixing band is locked to the band retaining ring, thereby fixing the wire harness, and therefore clips and protectors as used in the related construction are not necessary, so that the number of the parts can be reduced.

According to the second aspect of the present invention, the above-described wire harness mounting construction may further comprises a series of catching notches arranged in a one-way notched arresting manner, the catching notches being formed on that portion of one of inner and outer surfaces of the band body extending from the distal end of the band body toward the proximal end of the band body, and the band retaining ring having a lock portion for engagement with the catching notches to prevent the backward movement of the band body. In this construction, the length of the band body is suitably adjusted, and in this condition, the catching notches are locked to the band retaining ring. Therefore, the band body, tightened to fasten the wire harness, is effectively prevented from being loosened.

According to the third aspect of the present invention, in the wire harness mounting construction of the first or second aspect, preferably, the mounting portion is an instrument panel in a vehicle body, one of the recessed portion and the cavity portion is provided in an outer surface of a partition wall of an air duct formed on the instrument panel, and the band body is integrally formed at its proximal end on one of the recessed portion and the cavity portion. In this construction, the mounting portion is the instrument panel in the automobile, and more specifically is the air duct, and in this case the wire harness can be fastened and fixed by the band body, effectively utilizing the recessed portion or the cavity portion in the outer surface of the duct partition wall on which the band body is formed integrally.

According to the fourth aspect of the present invention, there is provided a wire harness mounting construction which comprises at least one harness fastening and fixing band including an elastic or flexible band body which is integrally formed at its proximal end on one of a recessed portion and a cavity portion in an outer surface of a partition wall of an air duct formed on an instrument panel of a vehicle body serving as a mounting portion, the band body having a free distal end, wherein by adjusting a length of the band body, the band body can be wound on a wire harness, a first band retaining ring formed on that portion of one of the recessed portion and the cavity portion corresponding to the harness fastening and fixing band, wherein the free distal end portion of the band body, wound on the wire harness, can be retained on the band retaining ring, so that the band retaining ring cooperates with the harness fastening and fixing band to fix the wire harness, and a second band retaining ring formed on that portion of the outer surface of the air duct partition wall corresponding to the harness fastening and fixing band, wherein the free distal end portion of the band body, wound on the wire harness, can be retained on the second band retaining ring, so that the second band retaining ring cooperates with the harness fastening and fixing band to fix the wire harness. In this construction, the bendable harness fastening and fixing band is locked to the band retaining rings, thereby fixing the wire harness, and therefore clips and protectors as used in the related construction are not necessary, so that the number of the parts can be reduced. At this time, the harness fastening and fixing band of the single specification is selectively locked to one of the first and second band retaining rings, and by doing so, various kinds of wire harnesses can be fixed.

According to the fifth aspect of the present invention, the wire harness mounting construction of the fourth aspect may further comprises a series of catching notches arranged in a one-way notched arresting manner, the catching notches being formed on that portion of one of inner and outer surfaces of the band body extending from the distal end of the band body toward the proximal end of the band body, and each of the first and second band retaining rings having a lock portion for engagement with the catching notches to prevent the backward movement of the band body. In this construction, the length of the band body is suitably adjusted relative to the first or the second band retaining ring, and in this condition, the catching notches are locked to the first or the second band retaining ring. Therefore, the band body, tightened to fasten the wire harness, is effectively prevented from being loosened.

According to the sixth aspect of the present invention, in the wire harness mounting construction of the fourth or fifth aspect, preferably, the band body is adjusted in length, and is locked to the first band retaining ring so that the band body can fix any one of several kinds of wire harnesses of different diameters, and the band body is locked to the second band retaining ring so that the band body can fix a wire harness in the form of a flat cable held in contact with the outer surface of the air duct partition wall. In this construction, only the harness fastening and fixing band of the single specification is provided, and several kinds of wire harnesses can be fixed by locking the fixing band to the first retaining ring, and also the wire harness in the form of a flat cable can be fixed in contact with the outer surface of the air duct partition wall by locking the fixing band to the second retaining ring. When fixing such a flat cable, a large installation space is not particularly necessary. As a result, there can be provided the wire harness mounting construction which is handy, and has a low-cost design.

As is clear from the above-described aspects of the present invention, the wire harness is fastened and fixed merely by the use of the bendable harness fastening and fixing band, and with this construction the wire harness can be fixed rapidly and positively. The present invention is directed mainly to the band tightening construction, and therefore even if there are some errors in dimensional accuracies of the parts for fixing the wire harness, this is acceptable, and the high dimensional accuracies are not particularly needed. It is important to note that several kinds of wire harnesses of different diameters, as well as the wire harness in the form of a flat cable, can be suitably fixed.

BRIEF DESCRIPTION OF THE DRAWINGS

FIG. 2 is partly cross-sectional, front-elevational view of the wire harness mounting construction of the first embodiment, showing the manner of fastening a wire harness;

FIG. 3A is a front-elevational view of the first embodiment of FIG. 1, showing the manner of fastening a medium-diameter wire harness;

FIG. 3B is a front-elevational view of the first embodiment, showing the manner of fastening a small-diameter wire harness;

FIG. 4 is a perspective view of a second embodiment of a wire harness mounting construction of the present invention, utilizing a recessed portion in an outer surface of an air duct partition wall of an instrument panel of a vehicle body;

DETAILED DESCRIPTION OF THE PREFERRED EMBODIMENTS

A preferred embodiment of a wire harness mounting construction of the present invention will now be described in detail with reference to FIGS. 1 to 6B.

Figure 1:
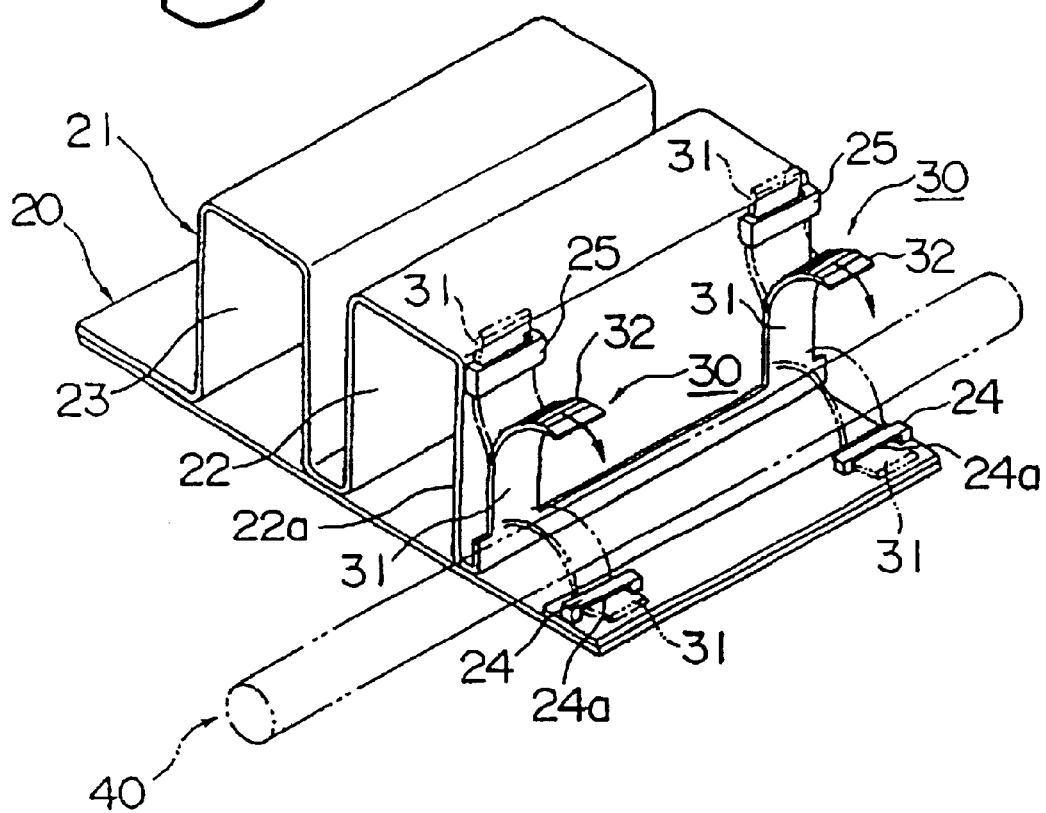
FIG. 1 is a perspective view of a first embodiment of a wire harness mounting construction of the present invention, utilizing a recessed portion in an outer surface of an air duct partition wall on an instrument panel of a vehicle body.

FIGS. 1 and 2 are a perspective view and a front-elevational, cross-sectional view of the wire harness mounting construction of the first embodiment, respectively, and FIGS. 3A and 3B are front-elevational, cross-sectional views of this embodiment, showing two modes of use, respectively. In FIGS. 1 and 2, for example, a vehicle body of an automobile serves as a mounting structural member, and in this case several recessed portions or cavity portions are provided in the mounting structural member. As shown in the drawings, an air duct 21 is provided on an instrument panel 20 in the automobile. This air duct 21 comprises, for example, a defroster duct 22 and a distribution duct 23 which are arranged adjacent to each other.

In this air duct 21, harness fastening and fixing bands (hereinafter referred to merely as "fixing band") 30 of a predetermined length are integrally formed on and extends from an outer duct partition wall 22a of the defroster duct 22, and the fixing bands 30 are elastic and flexible. The plurality of fixing bands 30 are provided at predetermined intervals in accordance with the length of the duct partition wall 22a and the length of installation of the wire harness.

Catching notches 32 in the form of sprocket teeth-like one-way lock teeth are formed on a reverse surface of each fixing band body 31 which is directed outwardly when the fixing band 30 is elastically bent. The catching notches 32 are provided on that portion of the fixing band body 31 extending a certain length from its distal end in its longitudinal direction.

First band retaining rings 24 for respectively retaining the fixing bands 30 are integrally formed respectively on those portions of the instrument panel 20 corresponding respectively to the fixing bands 30. The band retaining ring 24 has a groove-like retaining hole 24a having a width generally equal to the width of the fixing band body 31. A lock portion 24b in the form of projections or recesses is formed at an inner surface of the retaining hole 24a, and the catching notches 32, formed on the reverse surface of the band body 31, are engageable with the lock portion 24b.

Therefore, when the band body 31 of the fixing band 30 is first inserted at its distal end into the first band retaining ring 24, and further is passed a required length through this band retaining ring 24, the catching notches 32 on that portion of the band body 31, received in the first band retaining ring 24, are engaged with the lock portion 24b of the first band retaining ring 24. Therefore, the band body 31 is prevented from being withdrawn from the first band retaining ring 24, and is thus locked.

Second band retaining rings 25 are integrally formed respectively on those portions of the duct partition wall 22a of the defroster duct 22 corresponding respectively to the fixing bands 30, and these second band retaining rings 25 have substantially the same shape as that of the first band retaining rings 24, and have the same purpose.

The operation of the above wire harness mounting construction of the first embodiment will be described with reference to FIGS. 1, 2, 3A and 3B.

As shown in phantom in FIG. 1, the wire harness 40 is arranged along the outer surface of the defroster duct partition wall 22a of the air duct 20.

In FIG. 2, the band body 31 of the fixing band 30 is bent outwardly to be wound on the thus arranged wire harness 40 (this operation is indicated by reference character A), and the distal end of the bent band body 31 is passed through the retaining hole 24a in the associated first band retaining ring 24 formed on the instrument panel 20. The band body 31 is thus passed, and is tightly wound on the wire harness 40 to fix the same, so that the catching notches 32, formed on the reverse surface of the band body 31, are engaged with the lock portion 24b of the first band retaining ring 24. As a result, the wire harness 40 is fixed by the fixing band 30 locked to the first band retaining ring 24 against withdrawal therefrom (this operation is indicated by reference character B).

Then, according to the same procedure, the other fixing band 30 is locked to the associated first band retaining ring 24 on the instrument panel 20. By doing so, the wire harness 40 can be fixed at several regions spaced in its longitudinal direction.

The fixing bands 30 of the same specification can fix several kinds of wire harnesses (40) of different diameters.

For example, as shown in FIG. 3A, the fixing band 30 is suitably tightened and locked relative to the first band retaining ring 24 so as to fix a medium-diameter wire harness 41. Also, the fixing band 30 can fix a small-diameter wire harness 42 as shown in FIG. 3B.

In the first embodiment, wire harnesses to be fixed are not limited to those of a circular cross-section such as the wire harnesses 40 to 42. As is clear from FIG. 2, a wire harness 50, which is a so-called flat cable of a flattened cross-section, can be effectively fixed.

In the case of such a flat cable, the wire harness 50 is held against the outer surface of the duct partition wall 22a of the defroster duct 22. In this case, the band body 31 of the fixing band 30 is bent in a reverse direction, and the distal end of the bent band is passed through the associated second band retaining ring 25 formed on the duct partition wall 22a, and is locked thereto. As a result, the wire harness 50 is fixed on the outer surface of the duct partition wall 22a. In this case, there is obtained an advantage that a large installation space is not required for fixing the wire harness (flat cable) 50 of a flattened cross-section.

As described above, in the wire harness mounting construction of the first embodiment, not only several kinds of wire harnesses 40 to 42 of different diameters but also the wire harness (flat cable) 50 of a flattened cross-section can be fixed.

FIGS. 4, 5, 6A and 6B show a second embodiment of a wire harness mounting construction of the present invention. This embodiment is basically similar to the first embodiment, but is designed to fix only cables of a circular cross-sections. Those members identical or similar to those of the first embodiment of FIGS. 1 to 3B are designated by identical reference numerals, respectively.

Figure 5:
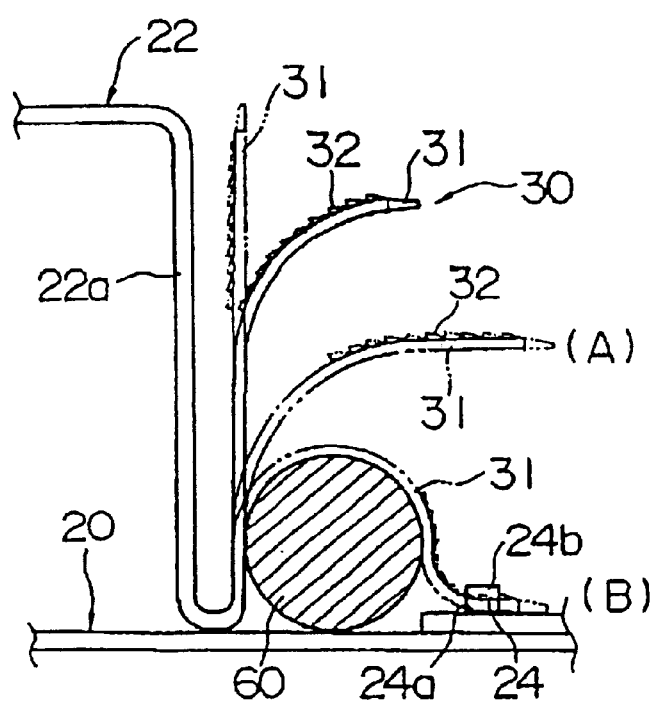
FIG. 5 is a partly cross-sectional, front-elevational view of the second embodiment of FIG. 4, showing the manner of fastening a wire harness.
Figure 6A:
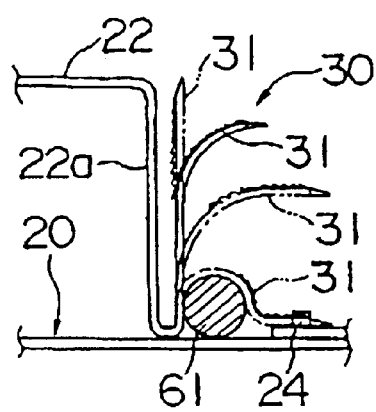
FIG. 6A is a front-elevational view of the second embodiment, showing the manner of fastening a medium-diameter wire harness.
Figure 6B:
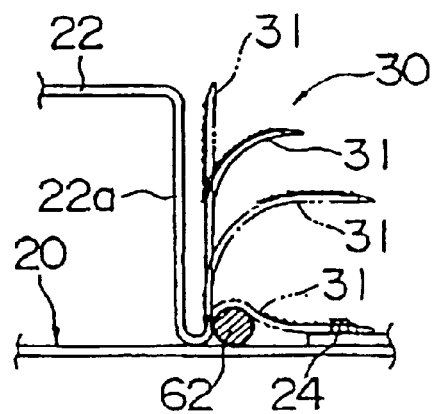
FIG. 6B is a front-elevational view of the second embodiment, showing the manner of fastening a small-diameter wire harness.
Figure 7:
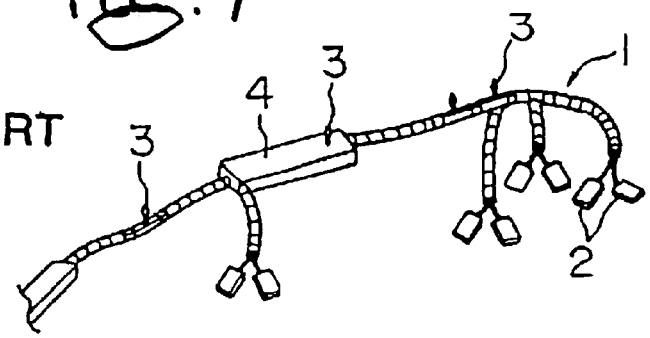
FIG. 7 is a perspective view of the related wire harness mounting construction using clips and protectors.
Figure 8:
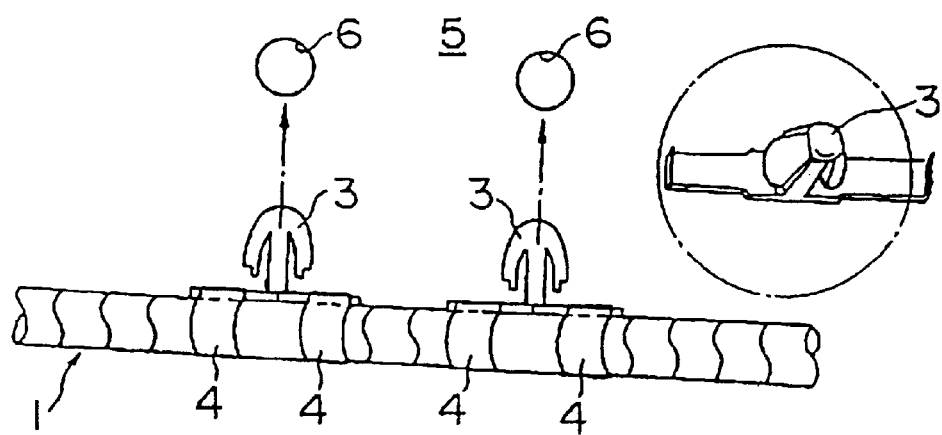
FIG. 8 is a side-elevational view of the related construction of FIG. 7, showing the manner of fixing a wire harness to mounting holes, formed in a vehicle body, by the clips.
Figure 9:
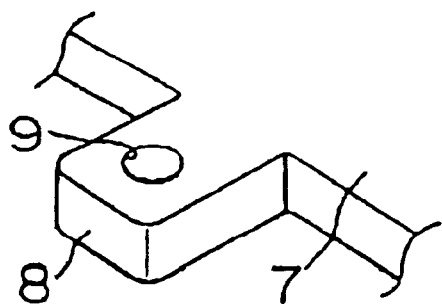
FIG. 9 is a perspective view of another related construction in which a harness mounting flange with a mounting hole for fixing a wire harness is formed on a vehicle body.
Figure 10:
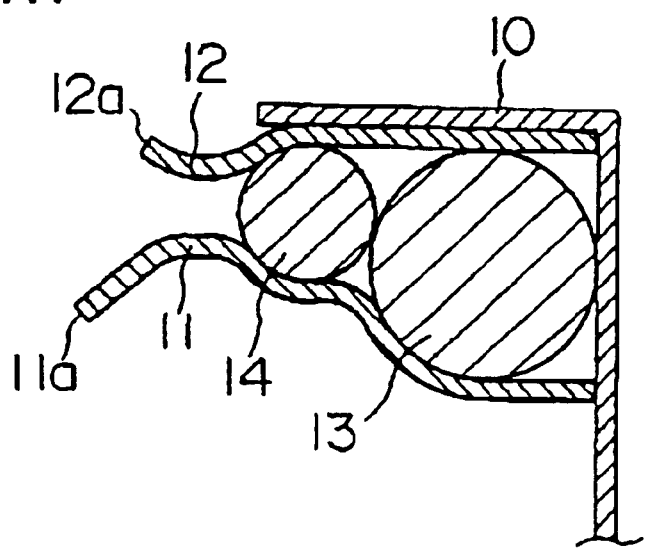
FIG. 10 is a cross-sectional view showing a related wire harness support construction.

As shown in FIGS. 5, 6A and 6B, a fixing band 30 is suitably wound on any one of several kinds of wire harnesses 60 to 62 of different diameters while adjusting its lock length, and cooperates with a first band retaining ring 24 on an instrument panel 20, thereby fastening and fixing the wire harness.

As described above, in the wire harness mounting construction of the present invention, for example, the duct partition wall of the air duct on the vehicle body of the automobile can be effectively utilized, and the bendable harness fastening and fixing band is locked to the band retaining ring, thereby fixing the wire harness. Therefore, clips and protectors as used in the related construction are not needed, and the number of the parts can be reduced. By selectively using the first and second retaining rings, several kinds of wire harnesses of different diameters and the flat cable can be fixed, thus providing the versatility. And besides, the parts, required for fixing the various wire harnesses, do not need to be processed so precisely, and therefore the overall cost can be reduced.

What is claimed is:

1. A wire harness mounting construction, comprising:

at least one harness fastening and fixing band including an elastic or flexible band body which is integrally formed at its proximal end on one of a recessed portion and a cavity portion in an outer surface of a partition wall of an air duct formed on an instrument panel of a vehicle body serving as a mounting portion, the band body having a free distal end, wherein by adjusting a length of the band body, the band body can be wound on a wire harness;

a first band retaining ring formed on that portion of one of the recessed portion and the cavity portion corresponding to the harness fastening and fixing band, wherein the free distal end portion of the band body, wound on the wire harness, can be retained on the band retaining ring, so that the band retaining ring cooperates with the harness fastening and fixing band to fix the wire harness; and a second band retaining ring formed on that portion of the outer surface of the air duct partition wall corresponding to the harness fastening and fixing band, wherein the free distal end portion of the band body, wound on the wire harness, can be retained on the second band retaining ring, so that the second band retaining ring cooperates with the harness fastening and fixing band to fix the wire harness.

2. A wire harness mounting construction according to claim 1, further comprising a series of catching notches arranged in a one-way notched arresting manner, the catching notches being formed on that portion of one of inner and outer surfaces of the band body extending from the distal end of the band body toward the proximal end of the band body, and each of the first and second band retaining rings having a lock portion for engagement with the catching notches to prevent the backward movement of the band body.

3. A wire harness mounting construction according to claim 2, in which the band body is adjusted in length, and is locked to the first band retaining ring so that the band body can fix any one of several kinds of wire harnesses of different diameters, and the band body is locked to the second band retaining ring so that the band body can fix a wire harness in the form of a flat cable held in contact with the outer surface of the air duct partition wall.

4. A wire harness mounting construction according to claim 1, in which the band body is adjusted in length, and is locked to the first band retaining ring so that the band body can fix any one of several kinds of wire harnesses of different diameters, and the band body is locked to the second band retaining ring so that the band body can fix a wire harness in the form of a flat cable held in contact with the outer surface of the air duct partition wall.

* * * * *